United States Patent [19]

Badagnani et al.

[11] 4,365,314
[45] Dec. 21, 1982

[54] ELECTRONIC ACCOUNTING MACHINE WITH SPLIT DISPLAY

[75] Inventors: Guido Badagnani, Fiorano Can.; Costanzo Zino, Borgomanero, both of Italy

[73] Assignee: Ing. C. Olivetti & C., S.p.A., Ivrea, Italy

[21] Appl. No.: 182,772

[22] Filed: Aug. 29, 1980

Related U.S. Application Data

[63] Continuation of Ser. No. 941,932, Sep. 13, 1978, abandoned.

[30] Foreign Application Priority Data

Sep. 23, 1977 [IT] Italy ............................ 69098 A/77

[51] Int. Cl.³ .............................................. G06F 3/14
[52] U.S. Cl. ................................................... 364/900
[58] Field of Search ... 364/200 MS File, 900 MS File, 364/710

[56] References Cited

U.S. PATENT DOCUMENTS

| | | | |
|---|---|---|---|
| 3,573,749 | 4/1971 | Smith et al. | 364/900 |
| 3,855,461 | 12/1974 | Stockwell | 364/200 X |
| 3,979,058 | 9/1976 | Katz et al. | 364/900 X |
| 4,079,449 | 3/1978 | Mercurio | 364/200 |
| 4,107,782 | 8/1978 | Cochran | 364/200 X |
| 4,121,284 | 10/1978 | Hyatt | 364/200 |
| 4,139,893 | 2/1979 | Poland | 364/200 X |
| 4,212,077 | 7/1980 | Vittorelli | 364/900 |

*Primary Examiner*—Harvey E. Springborn

[57] ABSTRACT

In an electronic accounting machine, a single line display shows both guiding messages entered by the programs of the machine and reply messages entered by an operator through a keyboard. The display is divided into a left part and a right part whose lengths are programmed by the machine. This latter enters a guiding message formed by a permanent part indicating the current work of the machine and a temporary part indicating the data required by the running program. These parts are displayed respectively on the left and the right part of the display. The keyboard reply message replaces the temporary part, whereby the reply message is displayed in the right part of the display simultaneously with the permanent part of the guiding message present on the left part.

6 Claims, 13 Drawing Figures

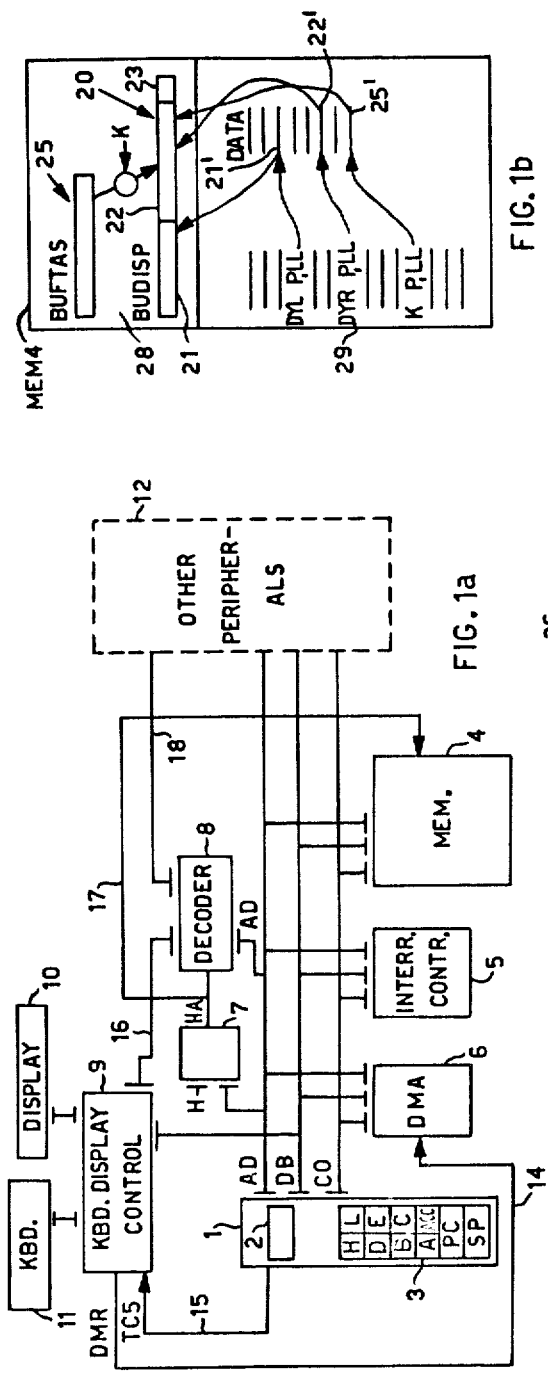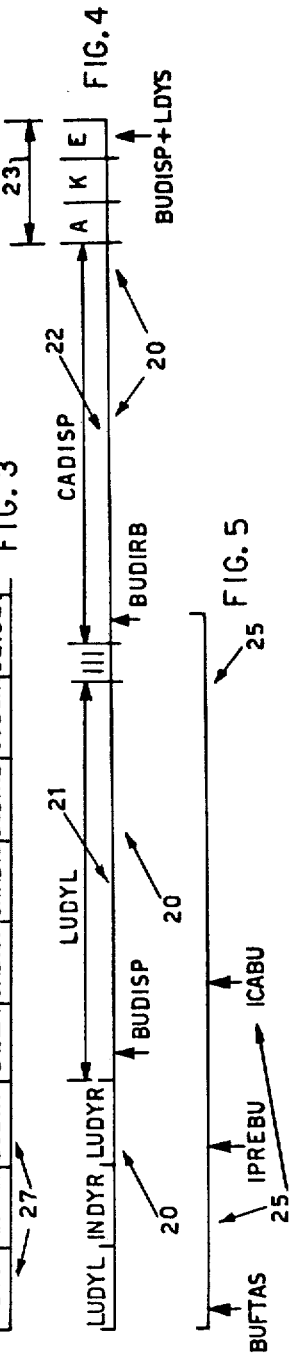

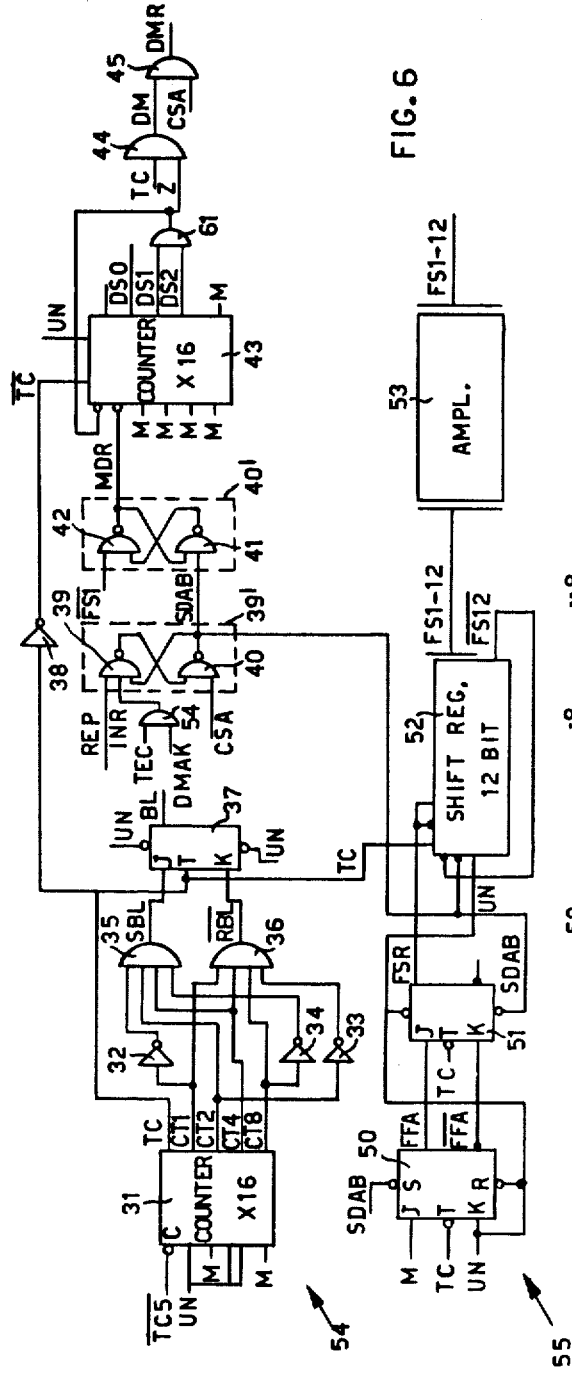
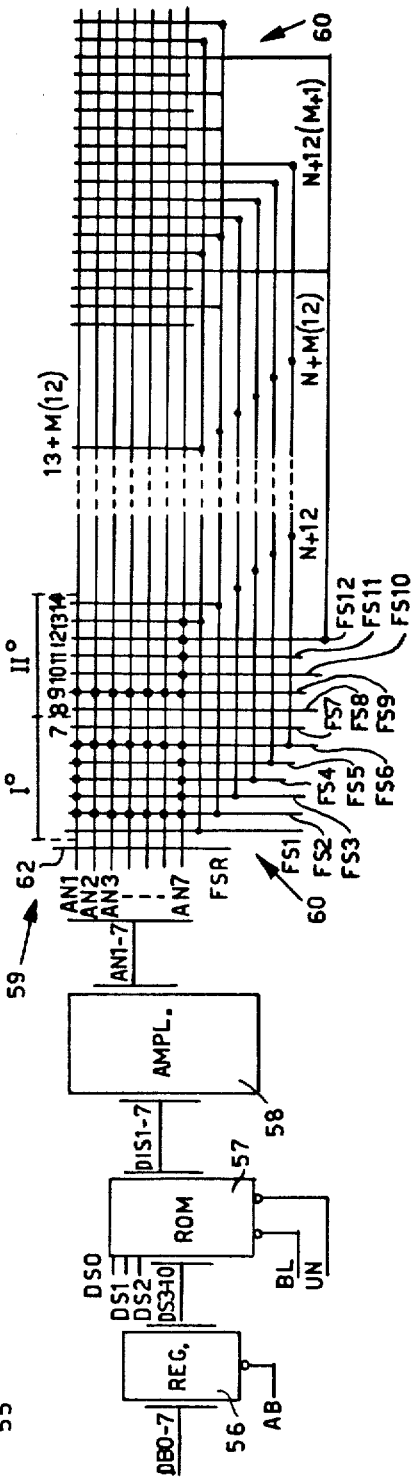
FIG. 6

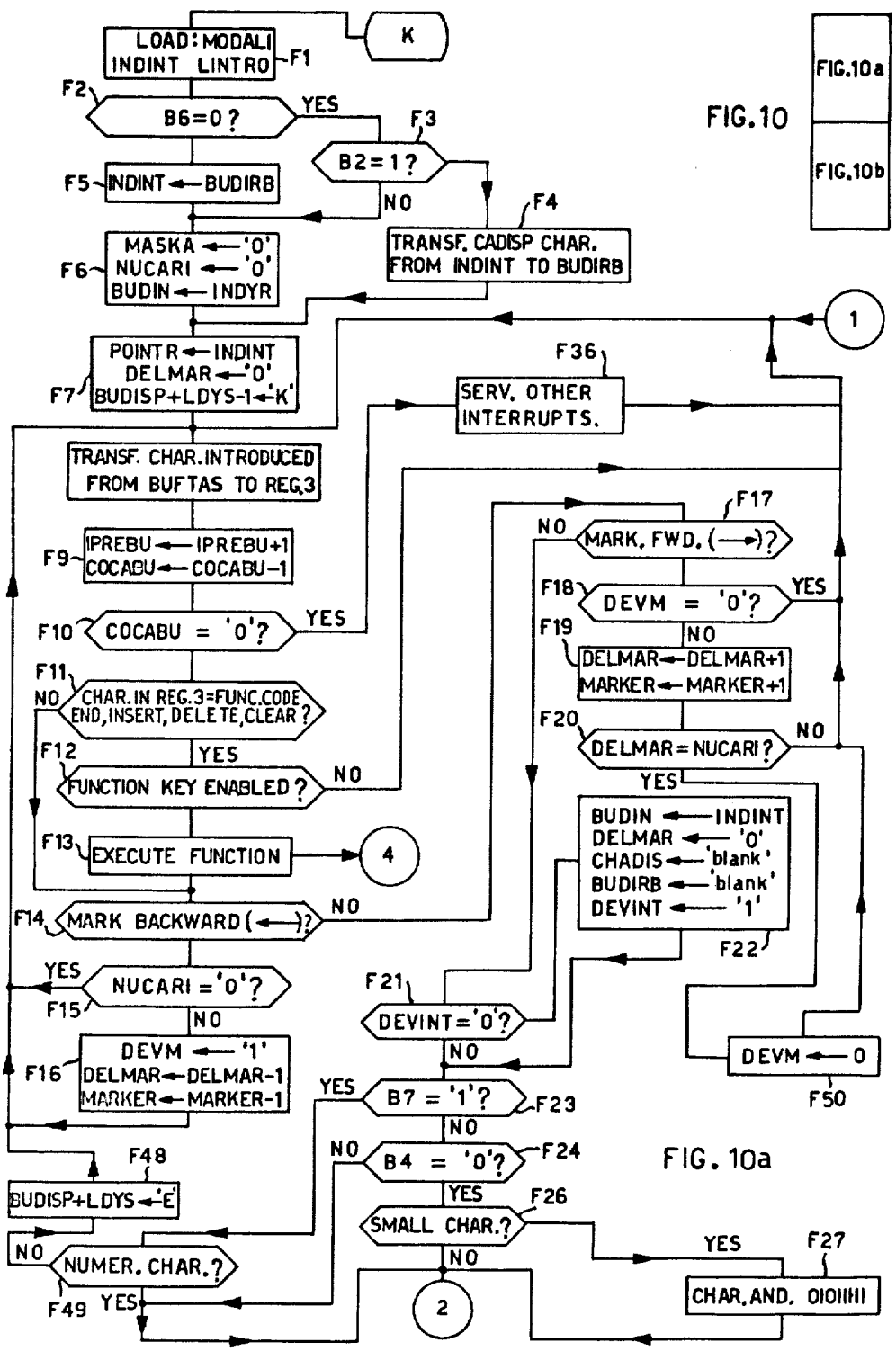

ELECTRONIC ACCOUNTING MACHINE WITH SPLIT DISPLAY

This is a continuation of application Ser. No. 941,932, filed Sept. 13, 1978, now abandoned.

BACKGROUND OF THE INVENTION

The present invention relates to an electronic accounting machine having a memory for storing information characters comprising data and instructions, a central unit for executing the operations commanded by the instructions on the data, a keyboard for introducing information into the memory, and an alphanumeric line display for visually displaying at the most one line of the said information.

With the introduction of microprocessors on the computer market, attempts have been made to facilitate communication between man and machine. More particularly, in recent years, the display has become ever more sophisticated in order to display as clearly as possible the requests of the machine and as to avoid errors.

There are in existence at present data terminals having page displays which are capable of representing visually the format of an entire document in which each field of information the operator must introduce is preceded by a corresponding heading, for example: "Name of customer . . . "; "Address . . . "; "Goods ordered . . . "; etc.

Obviously, it would be very uneconomical to have an electronic accounting machine comprising a page display of the above-mentioned type. On the contrary, electronic accounting machines comprise alphanumeric displays of small capacity (usually from 20 to 60 characters) which must contain all the messages necessary for a certain job (that is, a certain program).

Known accounting machines use a line display wherein the various messages are presented in succession.

The disadvantage of these machines consists in the fact that the operator sees alternately the operator guiding message sent by the machine and the characters in the stage of introduction and therefore does not have the possibility of seeing simultaneously the guide message and the characters introduced by means of the keyboard.

SUMMARY OF THE INVENTION

The object of the present invention is to provide an electronic accounting machine equipped with a polyvalent visual display, that is an electronic accounting machine which is capable of visually representing simultaneously, on a display having a maxiumum capacity of one line of characters, the operator guiding messages contained in two memory fields, and of replacing one of these messages by the characters which the operator introduces by means of a keyboard.

This and other objects are accomplished by the accounting machine according to the invention, which is defined by the claims.

BRIEF DESCRIPTION OF THE DRAWINGS

FIG. 1a is a block diagram of an accounting machine embodying the invention;

FIG. 1b is a diagram illustrating the loading of of the information;

FIGS. 2 to 5 show a number of storage registers;

FIG. 6 shows the control unit of the display;

DESCRIPTION OF A PREFERRED EMBODIMENT

Figure 7:
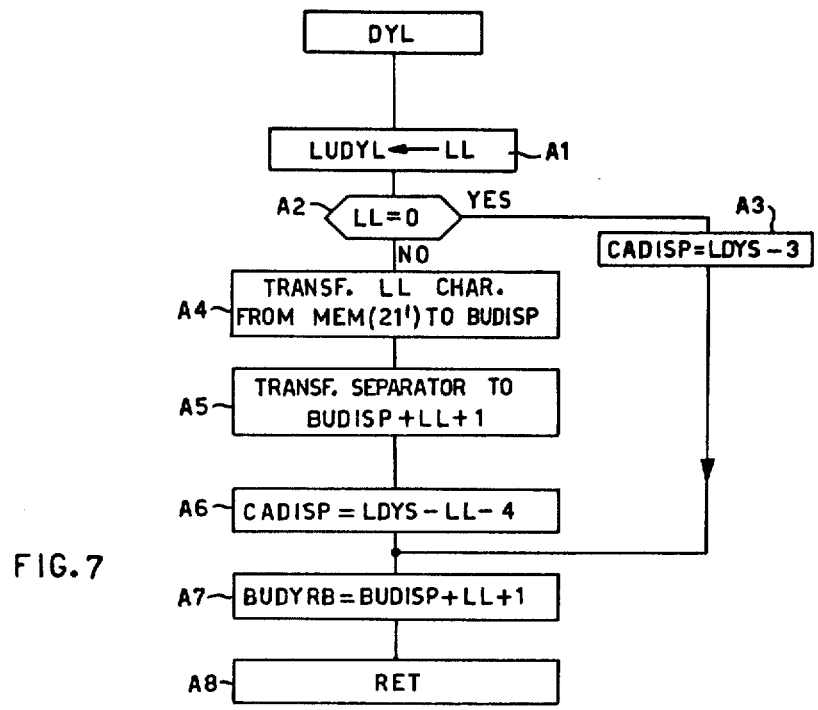
FIGS. 7 and 8 are flow diagrams of the instructions for handling the display.

The accounting machine of FIG. 1a comprises a microprocessor CPU 1 of the type known in the art, comprising in turn an arithmetic and logic unit ALU 2 and a group of general registers indicated by the letters A, B, C, D, E, H, L, an accumulator register ACC, a program counting register PC and a stack addressing register SP, a memory 4 containing microprograms, programs and data, an interrupt controller 5, a direct memory access controller DMA 6, a keyboard 11, a display 10, a keyboard and display controller 9, an address comparator 7, an address decoder 8, and other peripherals 12. The part of the controller 9 dedicated to the keyboard 11, will not be described in detail, since it is clearly described in the U.S. Pat. Appln. No. 831,530, now U.S. Pat. No. 4,212,077, assigned to the same assignee.

These elements are interconnected by means of three connecting channels: the address channel AD, the data channel DB and the control channel CO. Moreover, there are special connections 14–16 for the controller 9 with the CPU 1, the DMA 6 and the decoder 8 and with the data bus DB, and a channel 18 for the peripherals 12.

The general operation of the accounting machine of FIG. 1a takes place in the following manner. An instruction of the program is extracted by the CPU 1 from the memory 4 and the decoded version of this instruction addresses the memory 4 again (by means of the channel AD) and extracts therefrom the microinstructions commanding execution of the instruction itself. At the end of the instruction, the following instruction is extracted, the foregoing cycle being repeated, and so on.

If an input/output instruction is encountered, this generates predetermined addresses which are recognized by the comparator 7 by comparison of the address on the channel AD with a particular bit configuration H. If the comparison is positive, the signal HA is generated on the wire 17 and enables the decoder 8 and disables the memory 4. The decoder 8 decodes the address AD and generates signals on the channel 16 if the instruction concerns the keyboard or the display, or signals on the channel 18 if the instruction concerns the other peripherals 12. The signals commanding transfer are sent on the channel CO, while the data is transferred on the channel DB. It is to be noted that the signals on the channel CO comprise timing signals generated by a special circuit (not shown) of the CPU 1.

The input/output instructions moreover use the circuits DMA 6 and the interrupt controller 5, respectively, for direct peripheral-memory transfers and for transfers commanded by the CPU 1. It is to be noted that the CPU 1, the DMA 6, the interrupt controller 5 and the memory 4, the comparator 7 and the decoder 8 are all elements known in the art. More particularly, they may be of the LS1 type produced by INTEL and forming part of the "MCS80" Set and are described in the manual INTEL 8080 Microcomputer Systems User's Manal published in September 1975.

The memory 4 comprises (FIG. 1b) a zone 28 reserved for the operative system which includes the registers shown in FIGS. 2 to 5, and a zone 29 at the disposal of the user data and programs. FIGS. 2 to 5 contain an assembly of information necessary for handling the keyboard 11 and the display 10. More particularly, the contents of the register 26 of FIG. 2 have the following significances connected with the instructions appertaining to introduction from the keyboard:

MODALI method of introduction;
INDINT address of the zone 25 of the memory 4 in which the data introduced by means of the keyboard 11 is to be stored;
LINTRO length (number of characters) of introduction;
NUCARI number of characters introduced;
POINTR memory address at which the current character introduced is to be stored;
COINT counter for number of characters introduced;
MASKA bits used as switches and for enabling function keys;
FASET alternative jump address of a microprogram;
IPPEBU address for extraction of character from the keyboard buffer BUFTAS (FIG. 5);
ICABU address for loading of character into the buffer BUFTAS;
COCABU counter for characters comprised between ICABU and IPREBU.

The contents of the register 27 of FIG. 3 have the following significances connected with the instructions for visual representation on the display 10:

LDYS number of characters which can be represented visually by the display 10 and stored in BUDISP 20 (FIG. 4);
MARKER address in memory 4 at which the current character is to be stored;
BUDIN address of 1st character to be visually displayed;
DELM displacement of MARKER from BUDISP;
CADISP capacity of display for introduction of characters from keyboard;
CHADIS deposit for character to be modified;
BUDIRB address of introduction zone of BUDISP;
COBLIN counter for number of interrupts for intermittent visual display (blinking);
DEVBLK switch used by the microroutine of FIG. 3.

The contents of the register BUDISP 20 of FIGS. 1a and 4 have the following significances connected with the instructions for introduction and those for visual display:

LUDYL length of first part 21 of the display register 20;
INDYR initial address of the second part 22 of the display register 20;
LUDYR length of second part 22;
BUDISP initial address of the register 20;
Zone 23 state of machine.

The contents of the register BUFTAS 25 of FIGS. 1b and 5 are always constituted by the characters introduced from the keyboard. The register BUFTAS has a capacity of 16 characters and is handled by the pointers ICABU and IPREBU and by other zones of FIGS. 2 and 3, as will be better explained hereinafter in connection with FIG. 10.

During operation (FIG. 1b), the zone 21 of the register BUDISP is loaded with a first field 21' of the memory 4, the zone is loaded with a second field 22' of the memory 4, the zone 23 is loaded with characters indicating the state of the accounting machine and the whole is represented visually by the display 10. The zone 22 is replaced by the characters stored in the register 25 (this operation being indicated symbolically in the signal K) as they are introduced by means of the keyboard 11. The result is that during the introduction stage the display 10 simultaneously represents visually both an operator guiding message in the zone 21 and the characters introduced by the keyboard in the zone 22.

The controller of the display 10 is contained in the block 9 of FIG. 1a and is shown in FIG. 6. It is divided functionally into three sections: timing 54, phase generation 55 and display drive 59.

It is stated first of all that in FIG. 6 the constant signals at logical "one" and "zero" levels are indicated by the reference UN and M, respectively.

The timing section 54 receives the following signals from the CPU 1:
$\overline{TC5}$ timing (clock) signal at 200 KHz;
REP reset signal;
INR beginning-of-line signal;
CSA display enabling signals;
and generates the following signals as output:
BL blocks the character generating ROM 57 during change of address (DS0-DS2);
SDAB positions the shift register 52 at '0' and sets the flip-flop 50;
DS0-DS2 address in sequence seven locations of the ROM 57 for each character sent by the CPU 1;
DMR request for a character to the DMA 6;
TC local timing signal at 20 KHz for the display controller.

The phase generation section 55 receives as input the signals TC5, SDAB and TC and emits as output the signals FSR (which command the reset phase of the plasma display 60) and the phase signals FS1-FS12.

The display drive section 59 receives as input: the character (from the CPU 1) to be visually displayed, on the channel DB0-7, together with the enabling signal AB; the address signals DS0-DS2; the blocking signal BL for the ROM 57, and emits as output the anode driving signals AN1-7.

The timer 54 operates in the following manner. The signal $\overline{TC5}$ is demultiplied by the counter 31, which supplies the signal TC. The counter 31 generates the signals CT1, CT2, CT4 and CT8, while the NOT gates 32–34 generate the signals $\overline{CT1}$, $\overline{CT2}$ and $\overline{CT8}$, respectively. The AND gate 35 receives as input the signals $\overline{CT1}$, CT2, CT4 and $\overline{CT8}$ and emits as output the signal SBL, while the NAND gate 36 receives as input the signals CT1, $\overline{CT2}$, CT4 and CT8 and emits as output the signal $\overline{RBL}$. The signals SBL and $\overline{RBL}$ set and reset, respectively, the flip-flop 37, which generates the signal BL.

The NAND gates 39-40 and 41-42 form the flip-flops 39' and 40', so that the reset signal REP or the interrupt signal INR resets the signal SDAB, which in turn sets the flip-flop 50 and and the shift register 52, while the signal CSA sets the signal SDAB which activates the register 52 generating the signals FS1-FS12 and acts the flip-flop 51, which generates the signal FSR. The signal SDAB resets the flip-flop 40', while the signal $\overline{FS1}$ (which is obtained by means of a NOT gate (not shown) from the signal FS1 emitted by the register 52) sets the flip-flop 40', generating the signal MDR. The signal MDR enables the counter 43 to generate the signals DS0-DS2 which address seven consecutive cells of the ROM 57 relating to the seven column FS1-7 of a predetermined character being displayed. Each cell produces in fact a predetermined pattern of signals D1S1-7 selecting correspondent dots of a column FS being illuminated on the display 60. The bits DS0-DS2 assume seven configurations from 000 to 011 and, when the configuration 011 is reached, the AND gate 61 emits the signal Z which resets the counter 43 and enables the AND gate 44 at each pulse TC.

The AND gate 44 emits the signal DM which, together with the signal CSA (emitted at the end of each line) enables the AND gate 45 to emit the signal DMR.

The signal DMR is sent to the circuit DMA 6, which provides for sending a fresh line of characters to be visually displayed by extracting them from the register 20 of FIG. 4.

The phase driving circuit operates in the following manner. The signal SDAB sets the flip-flop 50, which generates the signal FFA which, in turn, sets the flip-flop 51 which emits the signal FSR enabling the shift register 52 and the firing electrode 62 of the display 60. The flip-flops 50 and 51 are timed by the signal TC. The signal TC commands the shift register 52, which activates the signals FS1-12 in sequence. The circuit 53 generates the voltages suitable for driving the columns of the plasma display 60.

The display drive section 59 receives on the data channel DB0-7 the character to be visually displayed, together with the enabling signal AB, and stores it in the register 56. The characters sent on the channel DB0-7 are always extracted from the register 20. The register 56 supplies this character to the ROM 57 (channel DS3-10), this forming the address together with the signals DS0-DS2. The validity of the data which is output by the ROM 57 on the channel DIS1-7 is given by the signal BL which disables the ROM during the change of address corresponding to the variation of the bits DS0-DS2. The signals DIS1-7 are sent as input to the anode driving circuit 58, this generating the signals AN1-7 which are applied to the corresponding anodes of the display 60.

The display 60 is constituted by a plasma tube having a reticle formed by seven rows and L columns. Obviously, L=7×LDYS, that is the display 60 has a capacity equal to that of the register 20. The seven rows are the anodes to which the bits DIS1-7 read from the ROM 57 are transferred. The L columns are the cathodes and are grouped together so as to form twelve groups connected to the twelve phases (FS1-12). The first group is formed by the columns 1^, 13^, 25^, 37^, 49^, 61^, etc.; the second group is formed by the columns 2^, 14^, 26^, 38^, 50^, 62^, etc.; and so on.

Initially, the reset phase FSR activates a special cathode 62, the purpose of which is to cause the firing discharge in the tube 60 without producing any visual display. Thereafter, while the anodes drive the dots of the current column to be illuminated, only one of the twelve phases is activated.

For example, in order to write the letter "O", the anodes present the following combinations of bits:

| Phase | AN1 ... AN7 | DS0-2 |
|---|---|---|
| FSR | ------- | --- |
| FS1 | 0000000 | 000 |
| FS2 | 1111111 | 100 |
| FS3 | 1000001 | 010 |

-continued

| Phase | AN1 ... AN7 | DS0-2 |
|---|---|---|
| FS4 | 1000001 | 110 |
| FS5 | 1000001 | 001 |
| FS6 | 1111111 | 101 |
| FS7 | 0000000 | 011 |

This cycle (excluding the signal FSR) is repeated for the character "L" sent thereafter by DMA 6 on the data channel DB0-7, which, however, concerns the phases FS8-12 and then again the phases FS1-2. It is to be noted that the first and seventh columns of each character are not illuminated in order to form the space between the characters. They are used only by the marker code, that is the intermittent light signal indicating the position on which the operator is acting by means of the keyboard.

The loading of the registers 20 and 25 takes place by means of the following instructions:

DYL P, LL visually displays LL characters in the left zone of the display;

DYR P, LL visually displays LL characters in the right zone of the display;

K P, LL introduces from the keyboard and visually displays LL characters in the right zone of the display.

The letter P indicates a pointer (not shown) stored in the zone 25 which contains the address of the messages (zones 21', 22' and 25') contained in the zone 29. The instruction DYL extracts the message 21' to be visually displayed and transfers it to the zone 21. More particularly (FIG. 7), the block A1 transfers the length LL to the register LUDYL (FIG. 4); the block A2 checks whether LL=0. It is to be noted that if LL=0 the block A3 reserves the whole display 60 less the last three positions for the instruction DYR, fixing CADISP=-LDYS−3. On the other hand, if LL is greater than zero, the block A4 then transfers the message to the zone 21. The block A5 transfers a special code "III" formed by three fully illuminated columns (2, 4 and 6), which has the function of separating the messages 21 and 22. The block A6 computes the length CADISP of the zone 22, while the block A7 computes the initial address BUDIRB of FIG. 4. The block A8 terminates the instruction, passing control to the interpreter.

Figure 8:
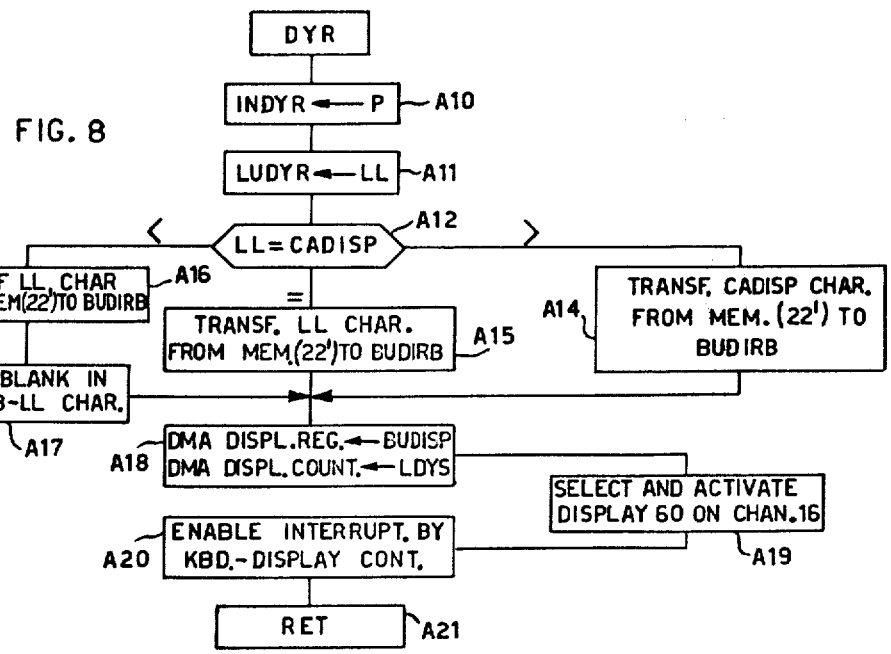

The instruction DYR extracts the message 22' to be visually displayed and transfers it to the zone 22 of the register 20. More particularly (FIG. 8), the block A10 loads the address of the zone 22' into the register INDYR (FIG. 4); the block A11 loads the length LL of the zone 22' into the register LUDYR. The block A12 checks whether LL=CADISP, that is whether the message is as long as the zone 22. If so, block A15 transfers it to the zone 22; on the other hand, if LL is greater than CADISP, only the first CADISP characters are transferred (block A14), while the remaining characters can be visually displayed by means of a command from the keyboard (MARKER backward key (←)). If, on the other hand, LL<CADISP, then LL characters are transferred (block A16) and space characters (blanks) are inserted in the remaining locations (block A17). From one of the blocks A14, A15 and A17 operation passes to the block A18, which loads address (BUDISP) and length (LDYS) of the register 20 to be visually displayed into the registers (not shown) of DMA 6. The block A19 selects and activates the display by means of a special address which is recognized by the comparator 7. In turn, the comparator 7 emits the signal HA, which activates the decoder 8 and deactivates the memory 4 via the wire 17.

The decoder 8 decodes the address AD and emits the reset command REP and the selection command CSA which command the first visual display of the register 20. Visual display comprises a stage of loading of the address BUDISP and the length LDYS of the register 20 into two registers (not shown) of DMA 6 by the CPU 1 and then sequential transfer of the characters contained in the register 20 to the register 56. The block A20 enables interruption by the keyboard and display controller 9. The block A21 terminates the instruction DYR, passing control to the interpreter, which selects the following instruction of the program. At the end of the visual representation given in the display 60, DMA 6 sends the signals TEC and DMAK. The signal TEC indicates the end of the transfer of the characters to the register 56, while the signal DMAK is the normal "received" response to the signal DMR emitted by the AND gate 45. The signals DMAK and TEC are applied as input to the AND gate 54 which, in turn, generates the interrupt signal INR. The signal INR resets the signal SDAB (as explained hereinbefore) which in turn blocks the visual display. Moreover, the signal INR is sent to the interrupt controller 5 which causes execution of the block E1 of the routine of FIG. 9. The routine of FIG. 9 again sends (block E2) the contents of the register 20 to the display 10 by means of DMA 6.

Figure 9:
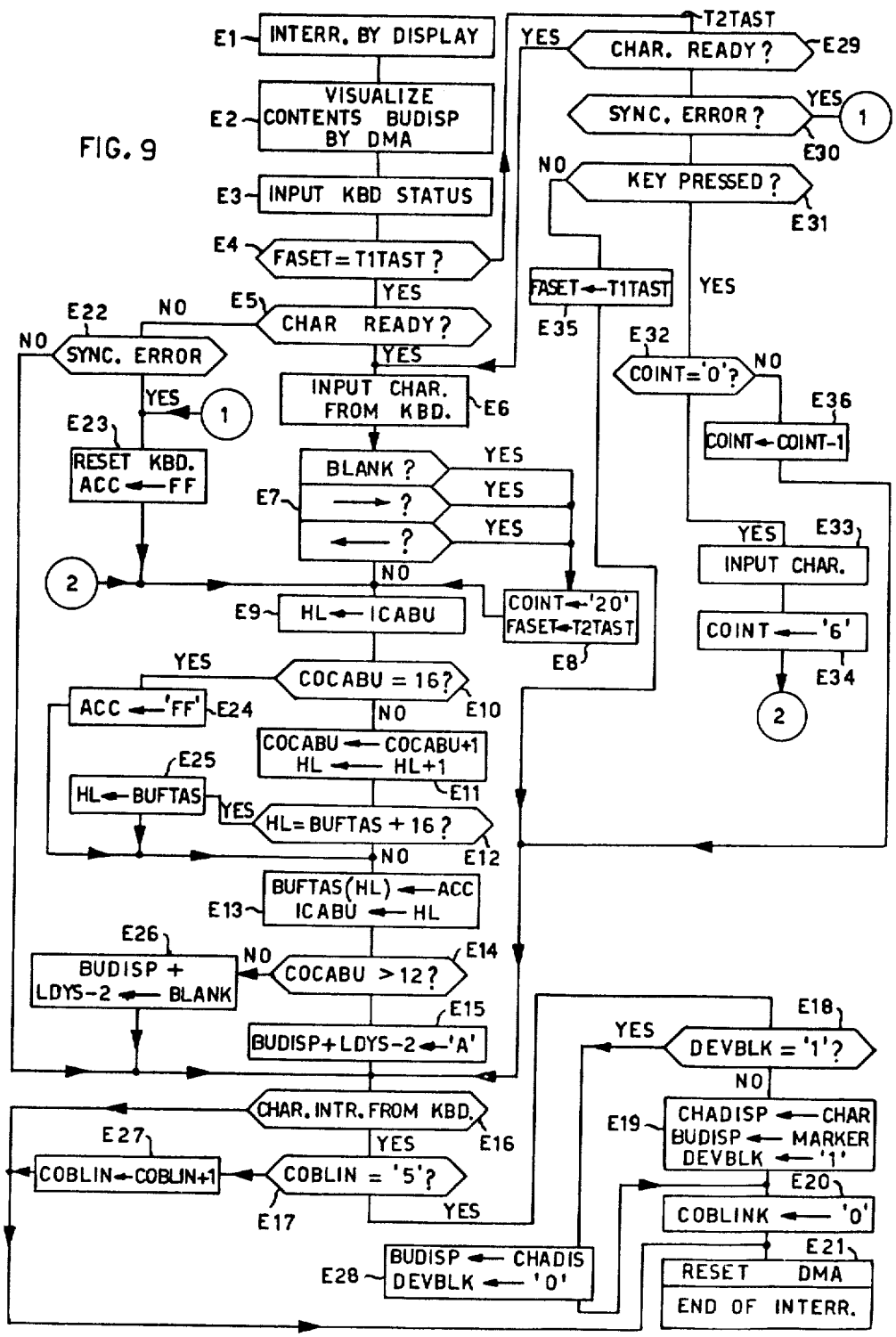
FIG. 9 is a flow diagram of a microprogram for handling the display.

The remaining part of the routine of FIG. 9 is devoted to the extraction of the characters from the keyboard 11 and transfer to the register 25. More particularly, the block E3 extracts a keyboard state character and deposits it in the registers 3. The block E4 checks whether the address T1TAS or the address T2TAS is stored in the register FASET (FIG. 2). In the event of FASET=T1TAS, the block E5 is executed and, in the event of FASET=T2TAS, a jump is made to the block E29. It is necessary to note that initially, since FASET=T1TAS, the block E5 is executed immediately. The block E5 checks whether a character has been entered or keyed and, in the affirmative case, the block E6 loads it into the accumulator register ACC of the CPU 1. If a character has not been entered, the block E22 is executed after the block E5 and examines whether an error of synchronism, that is two keys struck simultaneously, is involved. In the affirmative case, the block E23 is executed and resets the keyboard and the accumulator, while in the negative case a jump is made to the block E16.

From the block E6, the machine goes on to execute the block E7, which checks whether the character introduced can be repeated continuously ('space' characters, marker forward "→", and marker backward "←"). In the affirmative case, the block E8 is executed and loads '20' into the register COINT (FIG. 2) used as an interrupt counter, and moreover loads the address T2TAS into the register FASET. From the block E7, E8 or E23 the routine goes on to the block E9, which loads the address ICABU into the register H, L of the CPU 1. The block E10 checks whether COCABU=16, that is whether the register BUFTAS 25 is full. In the affirmative case, the block E24 resets the character introduced into ACC; in the negative case, the block E11 increments H, L and COCABU.

The block E12 checks whether H, L=BUFTAS+16, that is whether the character introduced occupies the last location in BUFTAS 25; in the affirmative case, the block E25 is executed and positions ICABU at the beginning of the register 25 (H, L=BUFTAS). From the block E24, E25 or E12 the routine goes on to execute the block E13. The block E13 deposits the character introduced from the keyboard in the register 25 and moreover stores the contents of the registers H, L in the register ICABU. The block E14 checks whether COCABU is greater than 12, that is whether BUFTAS has only four locations free. In the affirmative case, the block E15 is executed and loads into the location BUDISP+LDYS−2 the character 'A', which warns the operator of the fact that the register BUFTAS is almost full. In the negative case, the block E 26 is executed, which loads a 'space' character into the location BUDISP+LDYS−2. From the block E26 or E15 the routine passes on to the block E16, which checks whether a character has been introduced from the keyboard. In the negative case, the block 21, which terminates the routine, is executed, in the affirmative case the block E17 is executed and tests whether COBLIN=5. In the negative case, the block E27 is executed, which increments COBLIN and jumps to the block E21; in the affirmative case, the block E18 is executed, which tests whether the switch register DEVBLK=1. DEVBLK=0 is obtained during five interrupt cycles in which there is visually displayed the graphic MARKER symbol, that is an indicator of the position on which the next introduction from the keyboard will act. With DEVBLK=1, the MARKER is replaced by the character stored in the register CHADIS. The character stored in the register CHADIS initially is a "space", which is replaced by the character identified by the marker in the event of action being taken from the keyboard to modify a character introduced previously. In short, the blocks E17-E20 and E27-28 command alternately visual representation on the display of the MARKER and of the character contained in the cell of the register BUDISP identified thereby.

If, therefore, DEVBLK=1, the block E28 is executed, which replaces the character stored in the register CHADIS in the register BUDISP at the location identified by the MARKER and resets DEVBLK. If, on the other hand, DEVBLK=0 (block E19), the character identified by the MARKER is extracted from the register BUDISP and stored in the register CHADIS, the MARKER code is stored in the register BUDISP and, finally, DEVBLK is set (DEVBLK=1). It is to be noted that the operations identified by the blocks E19 and E28 use the cell DELMAR for identifying the position of the MARKER in the register BUDISP, while the cell MARKER identifies the current location of the user memory zone 29 in which the character introduced is to be stored. The block E20 is then executed and resets the counter COBLIN and, finally, the block E21 is executed, which terminates the interrupt routine.

As has been said hereinbefore, the block E8 loads '20' into the register COINT, which is used as an interrupt counter, and moreover puts T2TAST into the register FASET. The block E8 is reached only in the event of the character struck or entered allowing repetition (block E7). Let us assume that during the current interrupt one of these keys has been struck. In the following interrupt cycle, the block E4 will find FASET=T2TAST and will go on to execute the block E29. The block E29 is similar to the block E5 and therefore checks whether there is a character ready. In the affirmative case, there is a fresh introduction from the keyboard and therefore a return is made to the block E6. In the negative case, the block E30 is executed, which checks whether two keys have been actuated simultaneously. In the affirmative case, a jump is made to the block E23 which has been mentioned, while in the negative case the block E31 is executed, which tests whether the key previously found by the block E7 is still actuated. In the negative case, the block E35 is executed, which loads T1TAST into the register FASET and then jumps to the block E16. In the affirmative case, the routine goes on to the block E32, which tests the contents of the register COINT. If COINT=0, a fresh character is introduced by means of the block E33, '6' is loaded into the register COINT (block E34) and then the blocks E9-E21 are executed as explained hereinbefore. If COINT is different from zero, the block E36 is executed, which decrements the register COINT and jumps to the block E16.

From what has been said hereinbefore, it is clearly apparent that the functions performed by the display interrupt handling routine of FIG. 9 are as follows:

Visual representation on the display 60 of the contents of the register BUDISP 20 by means of DMA 6;

introduction of a character from the keyboard 11 into the register BUFTAS 25;

introduction of other characters in the case of continuously recurring characters (characters: "Space"; Marker forward (→); Marker backward (→));

alternation of visual display of the "marker" and of the character identified by it;

"Attention" signal for the operator (visual display of the character "A" in the location BUDISP+LDYS−2) in the event of the number of characters introduced into the register BUFTAS being at least 12.

Figure 10B:
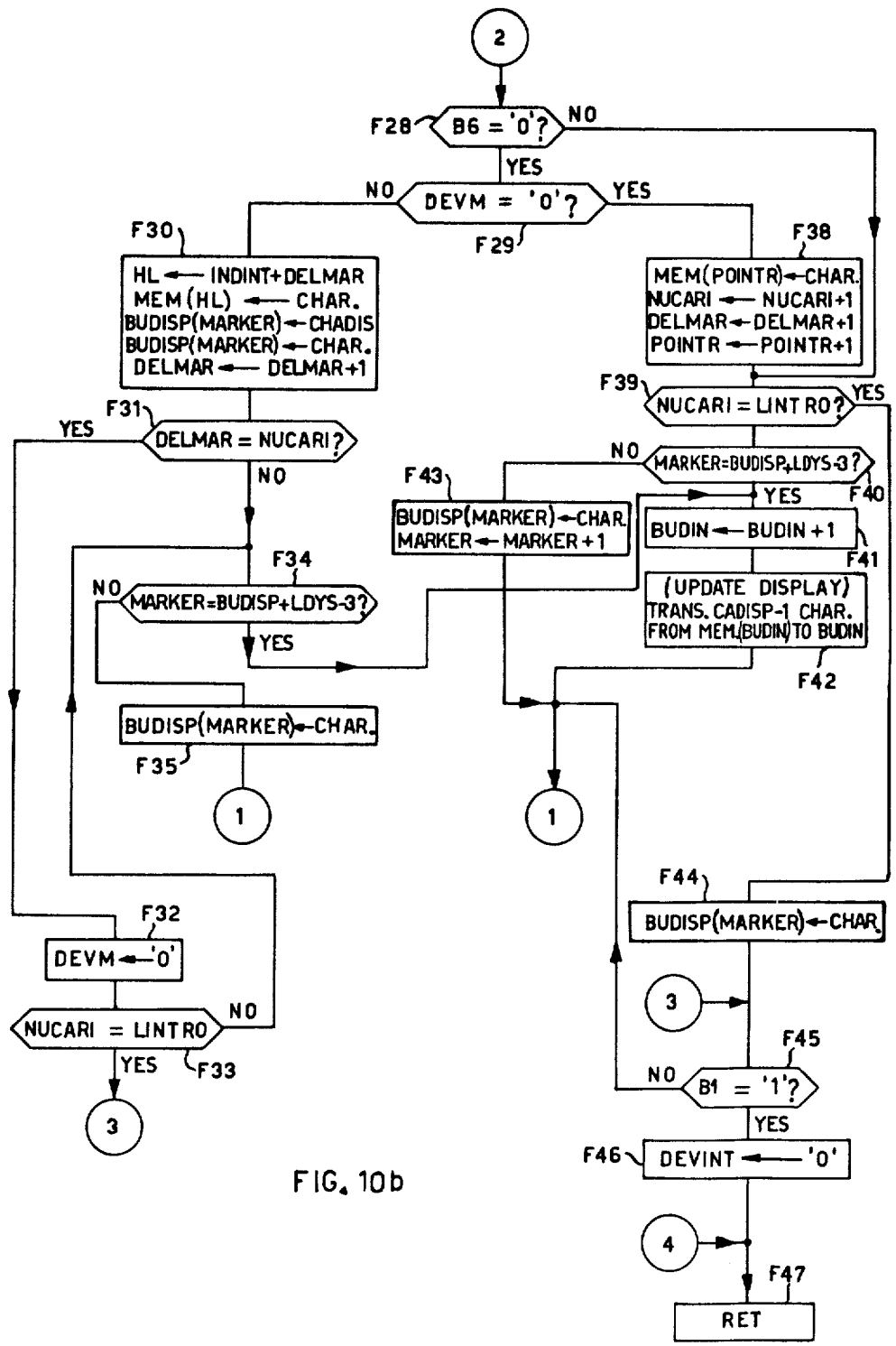
FIG. 10 shows the arrangement of FIGS. 10a and 10b which constitute flow diagrams of the instructions for handling the keyboard.

FIG. 10 is a flow diagram of the microprogram handling the instructions for introduction from the keyboard 11. These introduction instructions may be of various types:

KA Introduction of an alphanumeric field into memory;

KPM Introduction of an alphanumeric field into memory with printing;

KP Print the characters introduced without introduction into memory;

KN Introduction of a numeric field into memory;

KS Introduction of a numeric field with sign into memory;

KT Modify field of a pre-existing ememory field. These instructions comprise length LL and address II of the memory field concerned in the introduction.

When the program in course of execution decodes an instruction for introduction from the keyboard (indicated generally by K in FIG. 10), it executes it starting from the block F1, which loads the address II into the register INDINT, the length LL into the register LINTRO and, moreover, compiles the register MODALI according to the type of instruction encountered. More particularly, the register MODALI assumes the following significances:

| BIT | LOGICAL LEVEL | SIGNIFICANCE |
|---|---|---|
| 1 | 0 | alphanumeric introduction; |

| BIT | LOGICAL LEVEL | SIGNIFICANCE |
|---|---|---|
|   | 1 | numeric introduction; |
| 6 | 0 | introduction with storage in the zone 29; |
|   | 1 | introduction without storage in the zone 29; |
| 5 |   | not used; |
| 4 | 0 | reduced graphic set (only capital characters); |
|   | 1 | extended graphic set (with small characters); |
| 3 |   | not used |
| 2 | 0 | memory field initially empty; |
|   | 1 | memory field significant; |
| 1 | 0 | end of instruction by means of end-of-introduction key; |
|   | 1 | end of introduction either by means of end key or by means of check on exhaustion of introduction field (NUCARI = LINTRO); |
| 0 |   | not used |

The block F2 checks whether the bit 6 of the register MODALI is equal to zero. In the affirmative case, it executes the block F3 and, in the negative case, it executes the block F5, which loads the register INDINT with the initial address of the zone 22 (BUDIRB). The block F3 examines the bit 2 of the register MODALI: if B2=1, it executes the block F4 which transfers to the zone 22 of the register 20 CADISP characters starting from the INDINT address, which corresponds to the zone 25' of FIG. 1b. If, on the other hand, B2=0, the block F3 executes the block F6, which resets the registers MASKA and NUCARI and loads the address INDYR into the register BUDIN. From the block F4 or F6, the program goes on to execute the block F7, which loads the register INDINT into the register POINTR, resets the register DELMAR and loads the character 'K' into the penultimate cell of the register 20 (that is at the address BUDISP+LDYS−1). The block F8 transfers a character stored in the register 25 (FIG. 5) by the microprogram of FIG. 9 to the registers 3 of the CPU 1.

The block F9 increments the address IPREBU and decrements the counter COCABU. The block F10 checks whether COCABU=0. In the affirmative case (that is, if the character transferred in F8 is the last present in BUFTAS 25), the block F36, which serves for other possible interrupts, is executed and returns to execute the block F8. If, on the other hand, COCABU is greater than zero, then the block F11 is executed, which checks whether the character being examined is a function code of the following types: END OF INTRODUCTION; INSERTION OF CHARACTER; DELETION OF CHARACTER; or CLEAR. In the negative case, the block F14 is executed, while in the positive case the block F12 is executed, which checks whether the function key has been previously enabled. The enabling of the function keys, together with other information, is stored in the register MASKA, which has the following contents:

| BIT | SIGNIFICANCE | |
|---|---|---|
| B00 | DEVM, marker switch | is zero if the position of the marker coincides with the last character introduced |
| B10 | DEVINT, introduction | is zero for the first character |

-continued

| BIT | SIGNIFICANCE |
|---|---|
| | switch introduced |
| B20 | Enabling of character insertion key |
| B30 | Enabling of character deletion key |
| B40 | Enabling of CLEAR key |
| B50 | END OF INTRODUCTION |
| B60 | ⎫ |
| | ⎬ not used |
| B70 | ⎭ |

In the case of a key not being enabled, a return is made to execute the block F8 and, in the case of a key being enabled, the program goes on to the block F13, which executes the required function. More particularly, if the END-OF-INTRODUCTION key is recognized, a jump is made to the block F47. From the block F13, the block F14 is then executed, which checks whether the Marker backward key (←) has been actuated. In the positive case, the block F15 is executed, while in the negative case the block F17 is executed. The block F15 checks whether characters have been previously introduced (NUCARI=0) and, in the negative case (NUCARI=0), a return is made to the block F8. In the positive case (NUCARI>0), the block F16 is executed, which sets the marker switch DEVM=1, decrements the displacement of the marker (DELMAR), decrements the addresser of the marker (MARKER) and, finally, returns to execute the block F8. If a negative response is obtained by the block F14, the block F17 is executed, which checks whether the Marker forward key (→) has been actuated; in the positive case the block F18 is executed, in the negative case the block F21 is executed. The block F18 checks whether the marker switch is reset DEVM=0); in the affirmative case, it returns to execute the block F8, in the negative case it executes the block F19, which increments DELMAR and MARKER. The block F20 is then executed, which checks whether the position of the marker (DELMAR) corresponds to the last character introduced (that is, DELMAR=NUCARI). In the affirmative case the block F50 is executed, which resets DEVM and returns to the block F8; in the negative case a return is made directly to execute the block F8.

If the marker forward function key (→) has not been recogized by the block F17, the block F21 is executed, which checks whether DEVINT is reset. In the affirmative case, the block F22 is executed, which loads the initial address of the memory field 25' into the register BUDIN, resets the marker displacement register DELMAR, loads blank characters in the register 22 from BUDIRB and in the register CHADIS, sets the introduction switch DEVINT and goes on to execute the block F23. In the negative case, from the block F21, the block F23 is executed directly and checks whether the bit B7 of the register MODALI is set (that is, whether the introduction is numerical). In the affirmative case, the block F49 is executed, in the negative case the block F24 is executed. The block F49 checks whether the character examined is numerical and, in the negative case, the block F48 is executed, which loads an error signal (character E) in the last location of the register 20 (the location having the address BUDISP+BDYS) and returns to execute the block F8. In the positive case, a jump is made to the block F28. If the introduction is not numerical (bit B7 of MODALI=0), the program goes on from the block F23 to the block F24, which checks whether the introduction provides for a reduced graphic set (B4=0), that is a set formed by the capital letters only. In the positive case, the block F26 is executed, in the negative case the block F28 is executed.

The block F26 checks whether the character examined is a small character and, in the positive case, makes it a capital by executing the block F27, which applies to the character introduced the logical AND function with the binary constant 0101.1111. This is due to the fact that the difference between the codes of the capital and small characters consists in the fact that while all the capital codes have the bits seven and five always at zero, the codes of the small characters do not have the bits seven and five at zero. By zeroizing the bits seven and five, the logical AND between the code of a small character and the binary constant "0101.1111" transforms it into the code of a capital character.

From the block F27 the program goes on to execute the block F28, which checks whether the introduction requires storage in the field 25' of FIG. 1b by testing the state of the bit B6 of the register MODALI. If B6=0, the characters introduced are stored and block F29 is executed; on the other hand, if B6=1, block F39 is executed. The block F29 checks whether DEVM=0. In the affirmative case, the introduction of a fresh character is recognized and the block F38 is executed, while in the negative case it is recognized that the operator is changing a character introduced previously and the block F30 is therefore executed. The block F38 writes the character introduced into the zone 25' of the memory 4 at the address given by the register POINTR, then increments NICARI, DELMAR and POINTR and goes on to execute the block F39. The block F39 checks whether the number of characters introduced is equal to the length of the field 25', that is whether NUCARI=-LINTRO.

In the affirmative case, it goes on to the block F44, which deposits the current character in the zone 22 of the register 20 at the address specified by the register MARKER, while in the negative case the block F40 is executed. From the block F44 the program goes on to the block F45, which tests the state of the bit B1 of the register MODALI to establish whether the instruction can be terminated because of exhaustion of the programmed length (LINTRO). In the affirmative case (B1=1), the block F46 is executed, which resets DEVINT and terminates the instruction by means of the block F47. On the other hand, if B1=0, a return is made to the block F8. In the negative case, the program passes from the block F39 to the block F40, which checks whether the MARKER is loaded in the last cell of the zone 22 (prearranged for visually displaying the introduction) of the register 20. In the negative case, the program goes on to execute the block F43, which loads into the zone 22 the character introduced and increments the register MARKER. In the positive case, the program goes on the block F41, which increments the address of the first character of the zone 25' to be transferred to the zone 22, and the program then goes on to the block F42, which shifts the contents of the zone 22 of the register 20 by one character inasmuch as it transfers (CADISP−1) characters from the zone 25' starting from the address BUDIN previously incremented. A return is then made from the block F42 to execute the block F8.

If DEVM=0, the program goes on from the block F29 to execute the block F30, which loads into the registers H, L of the CPU 1 the address within the field 25' of the character to be changed identified by the register DELMAR (the address of this character is therefore given by INDINT+DELMAR), stores the character introduced by making the change, updates the register 20 by writing successively in the same location the character to be deleted (stored in CHADIS) and the character introduced, and the increments DELMAR. From the block F30 the block F31 is executed, which checks whether DELMAR=NUCARI, which corresponds to verifying whether the MARKER is positioned at the last character introduced. In the positive case, the block F32 is executed, which resets the marker switch DEVM. In the negative case, the block F34 is executed. From the block F32 the program goes on to execute the block F33, which checks whether the number of characters introduced is equal to the length of the introduction field 25' (NUCARI=LINTRO). In the positive case, the block F45 is executed, in the negative case the block F34 is executed. The block F34 checks whether the marker is positioned in the last cell of the zone 22 of the register 20. In the negative case, it deposits the character introduced in the zone 22 and returns to the block F8, in the positive case it executes the block F41, which has already been explained hereinbefore.

From what has been said hereinbefore it is apparent that the functions performed by the microprogram of FIG. 10 are the following:

- if the bit B2 of the register MODALI is equal to one, it transfers at least part of the field 25' to the zone 22 of the register 20 to permit modification;
- it loads into the zone 23 of the register 20 the character "K" indicating a request for introduction from the keyboard;
- it recognizes and executes the functions commanded by the keys which act on the characters introduced (KEYS: END OF INTRODUCTION; INSERT; DELETE; CLEAR);
- it recognizes and executes the functions (←;→) which act by shifting the message visually displayed to the right or left in the memory fields 22' and 25';
- if the bit B4 of the register MODALI is equal to zero (reduced graphic set with capital characters only) and if the character introduced has a code corresponding to a small character, it is transformed into a capital;
- it transfers the characters introduced to the field 25' of the memory 4 and loads them into the zone 22 of the register 20 to permit visual display;
- it modifies the characters previously introduced, both into the zone 22 and into the field 25';
- it signals errors of introduction to the operator by means of the visual display of a character 'E' in the last position of the display.

The result is, therefore, that the combined action of the instructions DYL, DYR, K of the microprogram of FIG. 9 and the control of the microprocessor CPU 1 and the display controller of FIG. 6 produces the following results. The instruction DYL controls by means of the CPU 1 the loading of the first part 21 of the register 20 with the information contained in a first memory field 21'. The instruction DYR controls by means of the CPU 1 the loading of the second part 22 of the register 20 with the information contained in a second memory field 22' and activates the display controller 9 controlled by the microprogram of FIG. 9. The transfer of the individual characters from the register 20 to the register 56 of FIG. 6 takes place autonomously by means of the direct memory access controller DMA 6. It is to be noted that the joint use of the routine of FIG. 9 and the DMA 6 enables the complexity and, therefore, the cost of the display controller 9 to be considerably reduced.

The instruction K controls by means of the CPU 1 the loading of the second part 22 of the register 20 with the information contained in a second register 25 or with the information contained in a third memory field 25'. The information contained in the register 25 is extracted from the keyboard as the operator actuates the keys by means of the microprogram of FIG. 9. Since the microprogram of FIG. 9 is activated by the controller 9 every 15 milliseconds, the result is that the register 25 contains at any instant all the characters entered on the keyboard, so that the operator sees the characters represented visually in the second part of the display (corresponding to the zone 22 of the register 20) as they are entered.

We claim:

1. A program controlled electronic accounting machine comprising a processor for controlling the machine functions by executing corresponding program instructions, a keyboard for manually entering data and messages to be processed by said processor, an alphanumeric line display having a maximum capacity of a line of characters and conditionable by said processor for selectively displaying operator guiding messages generated by said processor according to said program, and reply messages entered by said keyboard, each guiding message including a permanent part indicating the current program executed by the machine and a temporary part indicating the data required by the running of the current program, said line display including two different portions, one of which being conditionable to display said permanent part, the other portion being conditionable to display said temporary part of the guiding message, storing means controlled by said processor for normally storing said permanent and said temporary parts, output means conditionable periodically by said processor for connecting said storing means to said display for displaying the information stored in said storing means, and buffer means adapted to receive said reply message entered by said keyboard, said buffer means being controlled by said processor according to a predetermined instruction for transferring said reply message from said buffer means to said storing means as to replace said temporary part of the message, whereby said output means enables said line display to display the reply message alternately with said temporary part of the guiding message in one of said display portions, while the other display portion displays the permanent part of the guiding message for the whole time said program execution lasts.

2. Accounting machine according to claim 1, wherein said one portion of said line display which is used for displaying said permanent part of the guiding message is a left portion and the other portion of said line display which is used for alternatively displaying said temporary part and said reply message is a right portion.

3. Accounting machine according to claim 2, wherein said permanent and temporary parts of the guiding message are stored first in predetermined zones of an operating memory, said buffer means and said storing means being included in said memory and said storing means comprising a first and a second register adapted to be controlled by said processor upon executing respectively a first and a second instruction as to transfer said permanent part of the guiding message into said first register and said temporary part into said second register, said processor including means for causing, upon executing said predetermined instruction, the transfer into said second register of the reply message stored in said buffer means.

4. Accounting machine according to claim 3, wherein said display is controlled by said processor through a display controller and said output means comprise a direct memory access device controlled periodically by said controller and including channel means connecting said processor to said memory and to said controller, timing means for periodically generating signals for causing said controller to control said device, and interruption means conditioned by said device, when so controlled, for interrupting the action of said processor on said channel and starting the operation of said direct access device for transferring, through said channel means and said controller, the content of said first and second register to said display.

5. Accounting machine according to claim 3 wherein said first and second registers are adapted to store a variable number of characters, said permanent part of the guiding message formed of a first number of characters fixed by said first instruction, said temporary part of the guiding message formed of a second number of words fixed by said second instruction, and comprising means controlled by said first instruction for inserting a separating character into said first register after said first number of characters has been transferred therein, and means controlled by said second instruction for arresting any transfer into said second register when said second number of characters has been stored, whereby said left and right parts of the display have a variable length and appear divided by said separating character.

6. Accounting machine according to claim 3, wherein said reply message is formed by a plurality of characters sequentially entered by said keyboard, the second register comprises a plurality of cells associated with the character locations of said right display portion and said processor is controlled by said predetermined instruction for transferring the character introduced from the keyboard to the cell of said second register associated with the rightmost location of said right display portion and for shifting the second register towards the cells associated with the locations at the left of said rightmost location at each new character transferred to said second register, whereby the character stored in each cell is replaced by the following character as each fresh character is introduced from the keyboard.

* * * * *